United States Patent
Kelley et al.

(10) Patent No.: US 7,970,775 B2
(45) Date of Patent: *Jun. 28, 2011

(54) METHOD, SYSTEM, AND STORAGE MEDIUM FOR PROVIDING WEB-BASED ELECTRONIC RESEARCH AND PRESENTATION FUNCTIONS VIA A DOCUMENT CREATION APPLICATION

(75) Inventors: Edward E. Kelley, Wappingers Falls, NY (US); Tijs Y. Wilbrink, Voorburg (NL); Ellis Zijlstra, Haarlem (NL)

(73) Assignee: International Business Machines Corporation, Armonk, NY (US)

(*) Notice: Subject to any disclaimer, the term of this patent is extended or adjusted under 35 U.S.C. 154(b) by 559 days.

This patent is subject to a terminal disclaimer.

(21) Appl. No.: 12/105,446

(22) Filed: Apr. 18, 2008

(65) Prior Publication Data
US 2008/0195518 A1    Aug. 14, 2008

Related U.S. Application Data

(63) Continuation of application No. 10/605,433, filed on Sep. 30, 2003, now Pat. No. 7,401,068.

(51) Int. Cl.
*G06F 17/30* (2006.01)
(52) U.S. Cl. ......... 707/750; 707/771; 715/255; 709/203
(58) Field of Classification Search .................. 707/750, 707/771; 715/255; 709/203
See application file for complete search history.

(56) References Cited

U.S. PATENT DOCUMENTS

| | | | |
|---|---|---|---|
| 4,994,987 A | 2/1991 | Baldwin | |
| 5,001,696 A | 3/1991 | Baldwin | |
| 5,404,435 A | 4/1995 | Rosenbaum | |
| 6,008,807 A | 12/1999 | Bretschneider et al. | |
| 6,009,459 A | 12/1999 | Belfiore et al. | |
| 6,021,412 A | 2/2000 | Ho et al. | |
| 6,108,674 A | 8/2000 | Murakami et al. | |
| 6,192,381 B1 | 2/2001 | Stiegemeier et al. | |
| 6,195,093 B1 | 2/2001 | Nelson et al. | |
| 6,816,882 B1 | 11/2004 | Conner et al. | |
| 6,915,093 B2 | 7/2005 | Hatakeyama | |
| 7,133,863 B2 * | 11/2006 | Teng et al. | 707/708 |
| 2002/0023084 A1 | 2/2002 | Eyal et al. | |
| 2002/0065849 A1 | 5/2002 | Ferguson et al. | |
| 2002/0087592 A1 | 7/2002 | Ghani | |
| 2003/0033253 A1 | 2/2003 | Rhodes | |
| 2003/0033288 A1 | 2/2003 | Shanahan et al. | |
| 2003/0061201 A1 | 3/2003 | Grefenstette et al. | |
| 2005/0203835 A1 | 9/2005 | Nhaissi et al. | |

* cited by examiner

*Primary Examiner* — Khanh B Pham
(74) *Attorney, Agent, or Firm* — Cantor Colburn LLP

(57) ABSTRACT

An exemplary embodiment of the invention relates to a method and storage medium for providing web-based electronic research and presentation functions via a document creation application. The method includes scanning an active document on a computer to identify relevant keywords, searching a database for reference materials relating to the relevant keywords, and displaying relevant reference materials on the computer. The method further includes on-demand sharing of process software for providing the electronic research and presentation functions via the document creation application. The on-demand sharing includes creating a transaction containing unique customer identification, requested service type, and service parameters; sending the transaction to a server; querying the server about processing capacity associated with the server to help ensure availability of adequate resources for processing the transaction; and allocating additional processing capacity when needed to process the transaction.

18 Claims, 15 Drawing Sheets

METHOD, SYSTEM, AND STORAGE MEDIUM FOR PROVIDING WEB-BASED ELECTRONIC RESEARCH AND PRESENTATION FUNCTIONS VIA A DOCUMENT CREATION APPLICATION

CROSS-REFERENCE TO RELATED APPLICATION

This application is a continuation of U.S. patent application Ser. No. 10/605,433, filed Sep. 30, 2003, now U.S. Pat. No. 7,401,068 issued Jul. 15, 2008, the disclosure of which is incorporated by reference herein in its entirety. This application is also related to commonly assigned U.S. patent application Ser. No. 12/105,421, filed on Apr. 18, 2008, currently pending. This application is also related to commonly assigned U.S. patent application, Ser. No. 12/105,429, filed on Apr. 18, 2008, currently pending. These applications are incorporated by reference herein in their entireties.

BACKGROUND OF INVENTION

The present invention relates generally to electronic data processing tools and, more particularly, to a method, system, and storage medium for providing web-based electronic research and presentation functions via a document creation application.

The ability to create electronic slide presentations in the workforce has enabled enterprises large and small to provide training and disseminate quality information in a professional and organized manner. Presentation software allows users to mix presentation objects to create effective, high-quality presentations such as reports, classroom lectures, business charts, how-to training, as well as digital animation, audio/video media and similar items. Presentation software provides the functionality to handle various modes of information dissemination such as via a computer screen, a movie screen controlled by a laptop computer, a commercial kiosk, or live computer presentation.

Current technology allows presentation software users to create slides for incremental and sequential viewing of slide objects and limit the user to a one-dimensional presentation format. Existing presentation software and word processing applications restrict presentation to internal references, such as templates, and do not allow such systems to reference external sources that are controlled and sourced autonomically. Further, current presentation software and word processing applications do not provide the inherent capabilities for searching and retrieving archived data that are relevant to the document being created.

With respect to word processing software, a user who is creating the document currently does not have the capability to search for relevant content and incorporate it into the document unless the user first accesses a separate application or search engine.

Accordingly, it would be desirable to be able to enable a user to access and link relevant electronic content either over a network or from archived sources during the creation or editing of documents and presentations.

SUMMARY OF INVENTION

The foregoing discussed drawbacks and deficiencies of the prior art are overcome or alleviated by a method for providing web-based electronic research and presentation functions via a document creation application. The method includes scanning an active document on a computer to identify relevant keywords, searching a database for reference materials relating to the relevant keywords, and displaying relevant reference materials on the computer. The method further includes on-demand sharing of process software for providing the electronic research and presentation functions via the document creation application. The on-demand sharing includes creating a transaction containing unique customer identification, requested service type, and service parameters; sending the transaction to a server; querying the server about processing capacity associated with the server to help ensure availability of adequate resources for processing the transaction; and allocating additional processing capacity when needed to process the transaction.

BRIEF DESCRIPTION OF DRAWINGS

Referring to the exemplary drawings wherein like elements are numbered alike in the several FIGURES.

DETAILED DESCRIPTION

Disclosed herein is a method, system, and storage medium for providing web-based research and presentation functions via a document creation application. A document creation application refers to any software used to create and edit electronic documents including text-based, graphical, and multi-media documents. The content generation system of the invention enables a background search to be performed for relevant information during the creation of a presentation or document. The available material in the presentation provides the context for searching and scoring the 'found' references. In one embodiment, the best few found existing presentations or references are flashed on the computer screen for a short moment on or near the page that is most relevant to the page that is active in the user's presentation. The user may then select the flashed item and enter it into the current presentation or document.

Figure 1:
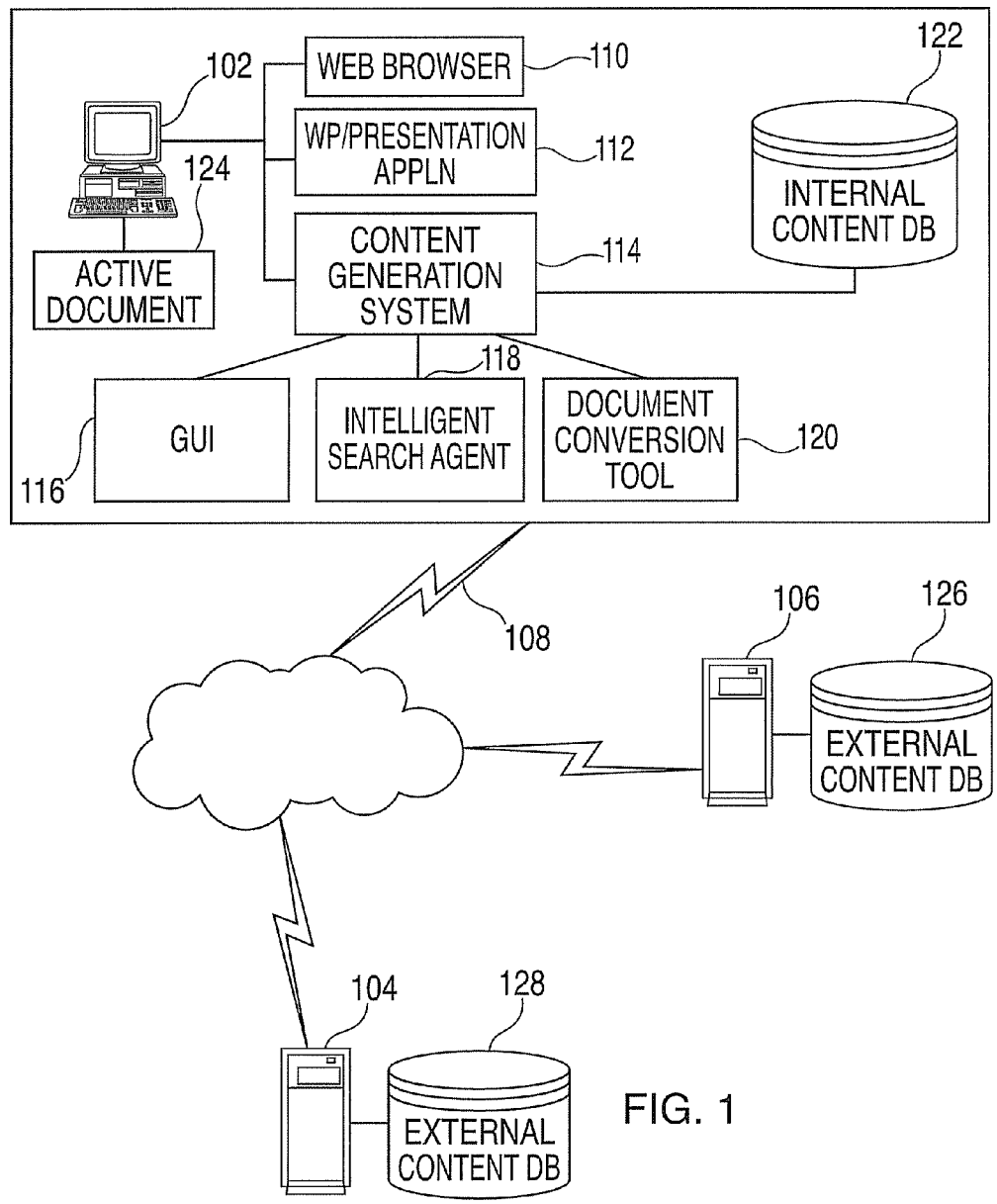
FIG. 1 is a block diagram of a system upon which the content generation system is implemented in accordance with an exemplary embodiment of the invention.

Referring initially to FIG. 1, there is shown a block diagram of a network system for implementing the content generation system. System 100 includes two server systems 104 and 106 in communication with a computer device 102 via a network connection 108.

Computer device 102 may be a general purpose desktop computer including operating system software, a web browser component 110, a document creation application 112, the content generation system 114 of the invention, and any other suitable programs that reside in memory and execute on computer device 102. Document creation application 112 may include word processing software such as IBM's Lotus WordPro™ or presentation software such as Microsoft's Power Point™ or IBM's Lotus Freelance™. It will be understood by those skilled in the art that the content generation software of the invention may be executed on computer systems with variant architectures. Internal content database 122 is in communication with computer device 102 and refers to any data repository that is local to computer device 102 and which is logically addressable to computer device 102. Internal content database 122 may be a separate storage device accessible via a local area network connection associated with the computer device 102, or may be, in fact, physically resident on computer storage device 102. Internal content database 122 stores text files, graphical data, archives of previous documents and presentations created via the content generation system 114, as well as other sources of data as will be explained further herein. Computer device 102 creates and edits documents via one of document creation applications 112 executing on the device. The current document being created or edited is referred to herein as the 'active document' 124. Computer device 102 is in communication with one or both of servers 106 and 104 via network connection such as a T1 line or cable 108 which accesses the Internet or other suitable means of networking architecture.

In an alternative embodiment, computer device 102 is a laptop that executes a presentation application 112 for displaying a presentation such as a slide show to an audience via a projection screen (not shown). The presentation itself is created by the content generation system 114 in conjunction with the presentation application 112. The presentation application 112 may be a commercial product such as Lotus Freelance™ or Power Point™. The content provided on the slide screens of the presentation may include hypertext indicia for actively accessing data over a network in external content databases 126 and 128, or archived data in internal content database 122, such that, when the presenter points to or clicks on the hypertext indicia, the presentation is transported to the content associated with the hypertext indicia. The creator of the presentation accomplishes this during presentation creation by selecting search results discovered by the content generation system 114 and pasting the desired Uniform Resource Locator (URL) directly into the active presentation document 124.

The content generation software 114 of the invention includes an intelligent search agent 118 that allows a user to search and retrieve relevant data. The search component 118 preferably uses advanced pattern matching technology, or non-linear adaptive digital signal processing, rather than key word search technology for this function. In this manner, patterns that naturally occur in text or speech are identified based upon usage and frequency of occurrence or other rules adopted which, in turn, correspond to concepts or ideas that relate to accurate and relevant content.

Content generation system 114 further comprises a graphical user interface 116 for enabling a user of computer device 102 (also referred to herein as 'content creator') to effortlessly view and manipulate search results (also referred to as reference materials) conducted by the tool. Sample computer screens illustrating some of the features of the graphical user interface 116 are displayed in FIGS. 2 and 3.

A document conversion component 120 is utilized by the content generation system 114 to convert selected reference materials or search results retrieved by the content generation tool 114 into the format for which the active document 124 was created. Document conversion may occur in different ways. For example, if the source format of the search results is supported by the application that is being used to prepare the active document, then standard 'import' functionality is used to import the search result. If the application used by the active document does not support the format of the source data, a 'copy and paste' functionality of the operating system may be used to transfer the selected input to the active document. The latter option uses screen capture for graphical components and a general 'copy and paste' for the text components within the selected input. Alternatively, the selected input as a whole may be copied into the document, which is then analyzed by the application software that provides for this functionality. For example, IBM's Lotus Freelance™ comprises an engine that will reconstruct unsupported text to a format that enables moderation of that text.

Server systems 104 and 106 each comprise a high-powered multiprocessor computer device including web server and applications server software for receiving requests from computer device 102 to access web pages via the Internet or other network. For example, a server system may be managed by a business organization that disseminates product information and services over its website and interacts with customers conducting electronic business over the server system. A server system may be operated by an electronic utilities business that outsources computing resources such as applications, processor resources and bandwidth, as well as data mining resources. In an alternative embodiment of the invention, the server system 104 is an e-utilities provider that outsources the content generation system 114 of the invention to third parties such as server system 106 or computer device 102.

External content databases 128 and 126 represent data warehouses of information accessed by the respective server system 104 and 106. External content databases 128 and 126 store web pages, reference materials such as white papers or technical documents, graphs, charts, video, and any type of content typically existing in a web environment. External content databases 128 and 126 are distinguished from internal content database 122 in that the data searched and retrieved from external content databases 128 and 126 originate from a network location external to the computer device 102.

The content generation system 114 may be executed as a standalone application that is installed or downloaded on computer device 102 or may be incorporated into an existing document creation application such as a word processing software program or similar commercially-available product as an enhancement feature. Further, as indicated above, the features of the content generation system 114 may be provided via a third party application service provider (ASP) or e-utilities broker where service is provided for a per-use fee.

Figure 2:
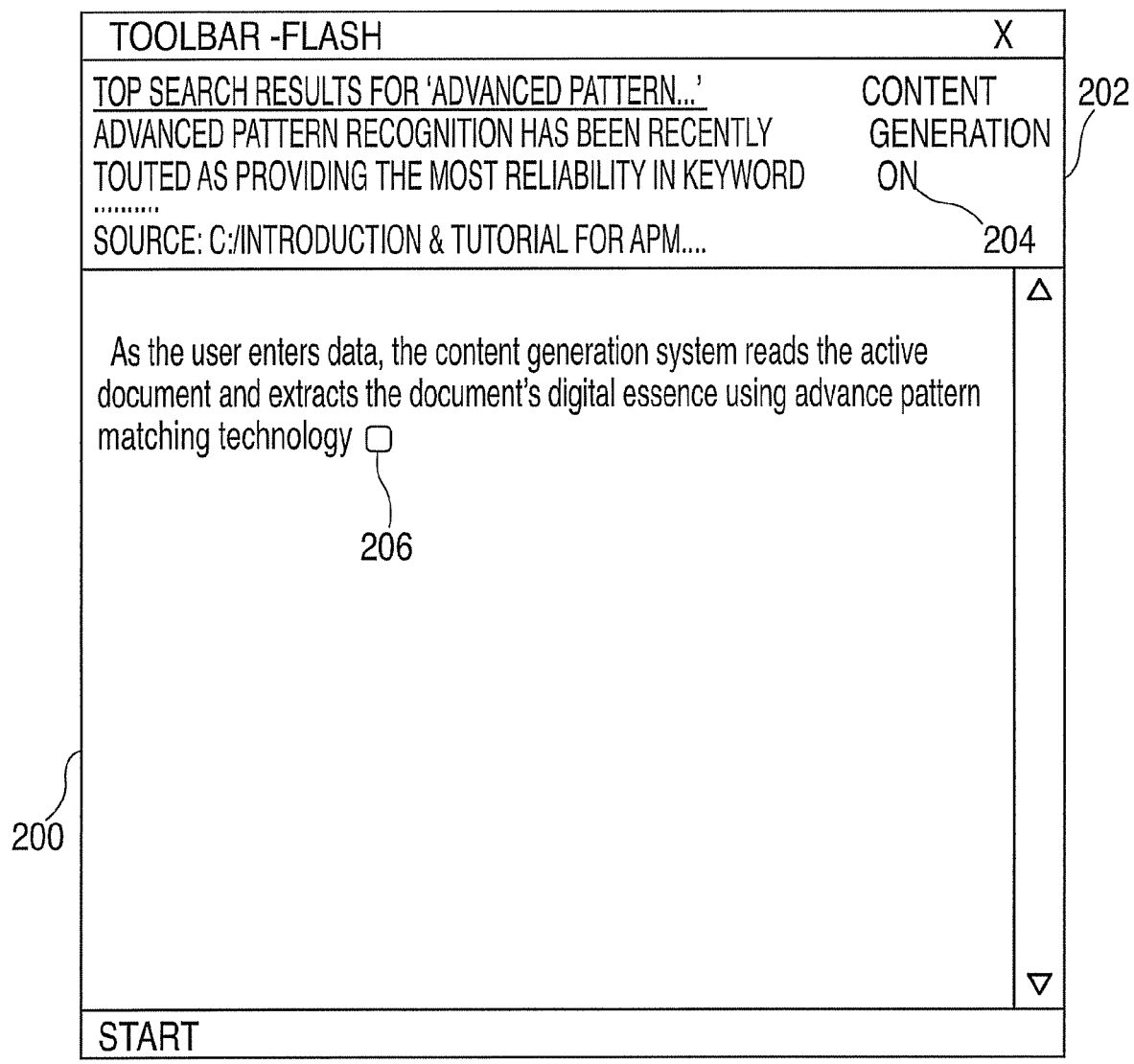
FIGS. 2 and 3 illustrate sample computer screen windows including search results provided by the content generation system, in accordance with a further aspect of the invention.
Figure 3:
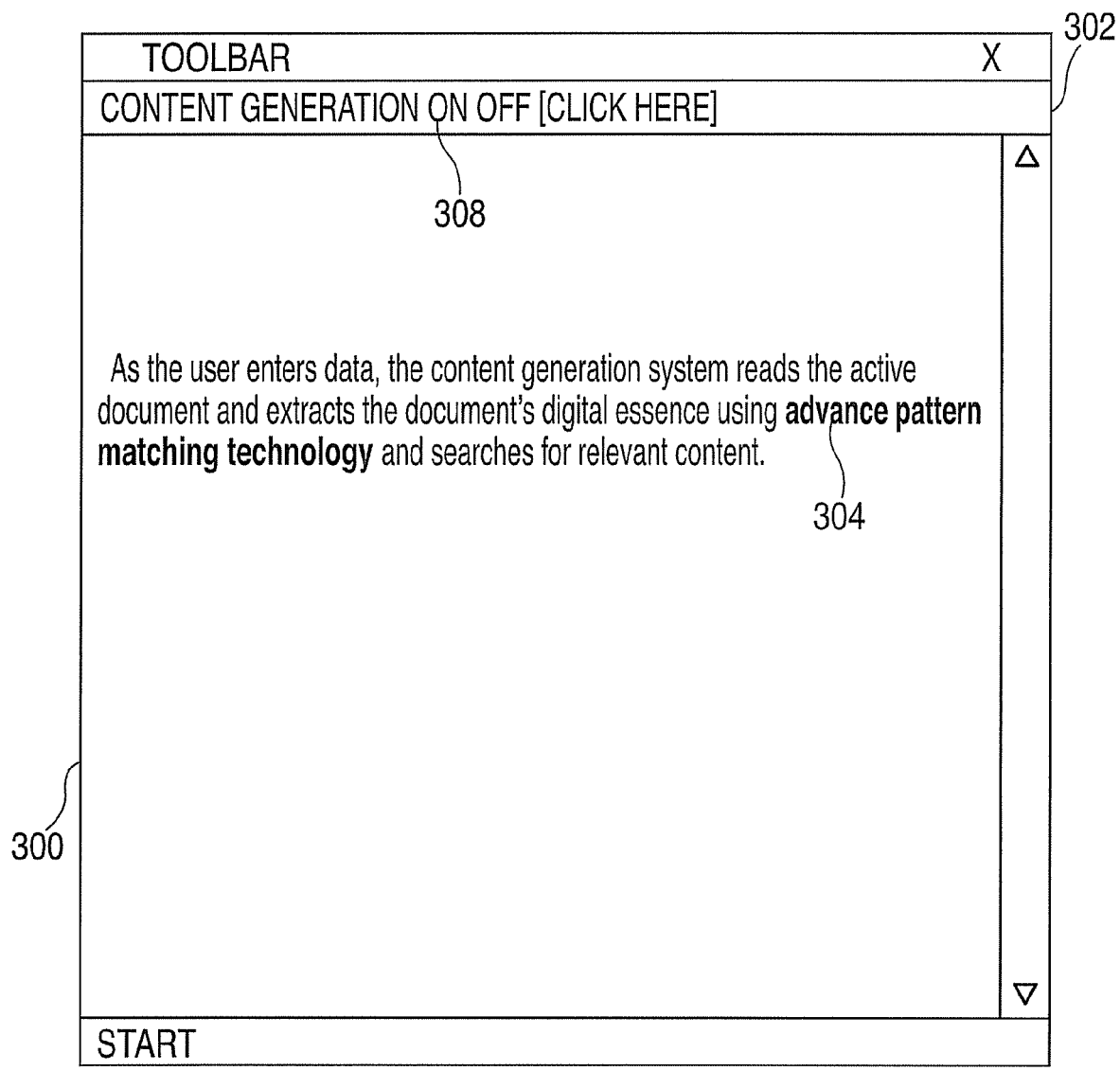

The content generation system 114 can be enabled or disabled during execution of the document creation application 112. The user interface 116 includes a toolbar 202, 302 shown in FIGS. 2 and 3 that allow a user to toggle the system ON or OFF. FIG. 2 illustrates a sample computer screen window 200 in which a user is viewing the text of an active document 124 with the content generation system toggle 204 in the ON position. The computer screen window 200 of FIG. 2 displays the active document being edited by the user wherein the cursor 206 is left at the end of the most recently entered text. The intelligent search agent 118 reads the text and searches for relevant references based upon the text contained in the active document. This reading and searching is imperceptible to the user. The intelligent agent 118 searches external content databases 126 and 128 via web browser component 110 and searches internal content database 122 using search facilities provided by the operating system and/or applications resident on computer device 102. When the intelligent agent 118 finds a reference determined to be relevant, the content generation system 114 reveals the results to the user on the computer screen of computer device 102 in a location at or near the text searched.

In one embodiment, the content generation system 114 includes a toolbar 202 as shown in FIG. 2. The search results, or a portion of the search results, are displayed in the content generation system toolbar 202. In an alternative embodiment, the results may be flashed momentarily on the computer screen in a location at or near the searched text such as near cursor 206. In yet another embodiment, the appearance of a phrase or text portion of the active document may be changed or highlighted to reflect the discovery of search references related to the highlighted text 304 as shown in the computer screen window 300 of FIG. 3. The user selects the highlighted text, or alternatively, toggles the content generation ON/OFF icon 308 in toolbar 302 to the ON position. The search results are then presented to the user on computer screen 300 as desired. The user may be prompted to select a result before obtaining additional details for the result. The results may be presented in a number of different formats including a listing of URLs or file directory locations, or the actual search result text itself may be displayed as shown in FIG. 2. The search is performed not only within the internal content database 122, but other databases such as external content databases 126 and 128 are searched as well.

Figure 4:
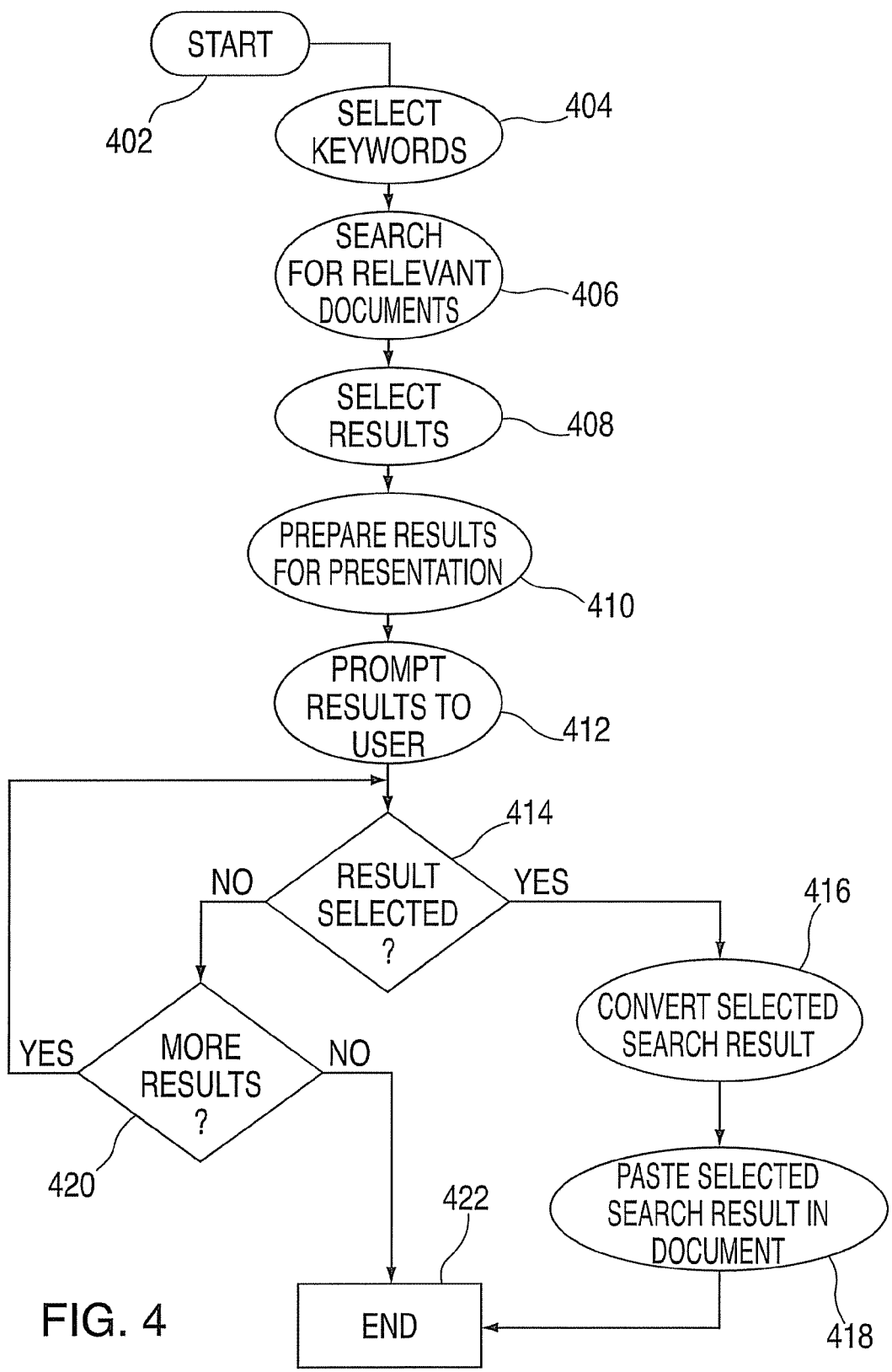
FIG. 4 is a flowchart describing a process of implementing the content generation system within a document creation application in accordance with a further aspect of the invention.

FIG. 4 is a flowchart describing the process of implementing the content generation system 114 in a preferred embodiment. A user creating a document or presentation on computer device 102 turns the content generation system 114 on for assistance in preparing a document at step 402. The intelligent agent 118 of content generation system 114 selects keywords from the active document for analysis at step 404. Step 404 is described in further detail in FIG. 5. Using the key words, the content generation system 114 searches for relevant documents or references at step 406. This may be accomplished via web browser component 110. The intelligent agent 118 analyzes the search results and selects the most relevant references at step 408. The content generation system 114 prepares the results for presentation at step 410. A web browser engine 110 on client system 102 provides the functionality to ensure that data in search results found are in a format that is capable of being displayed to the user on the computer screen such as in window 202 of FIG. 2. The results are presented to the user via a computer screen window at step 412. The results may also include displaying a Uniform Resource Locator with a preview pane associated the reference materials on the computer screen.

At step 414, it is determined whether the user selected a result from the list of resulting reference materials provided. If so, the document conversion tool 120 of the content generation system 114 converts the search result to the format used by the user in creating the document 124 at step 416. The converted result is pasted into the active document at step 418. Step 418 is described in further detail in FIG. 6.

If, on the other hand, the user does not select a result from the list at step 414, the content generation system 114 prompts the user to see if he/she would like to view additional search results at step 420. If the user responds affirmatively at step 420, the content generation system 114 returns additional results to the user at step 412. If the user does not wish to view additional results, or alternatively, the user has finished the document, the process ends at step 422. If the user closes the document, the search results, as well as the text portion they refer to, are stored in a hidden section of the document, or the system's own database.

Figure 5:
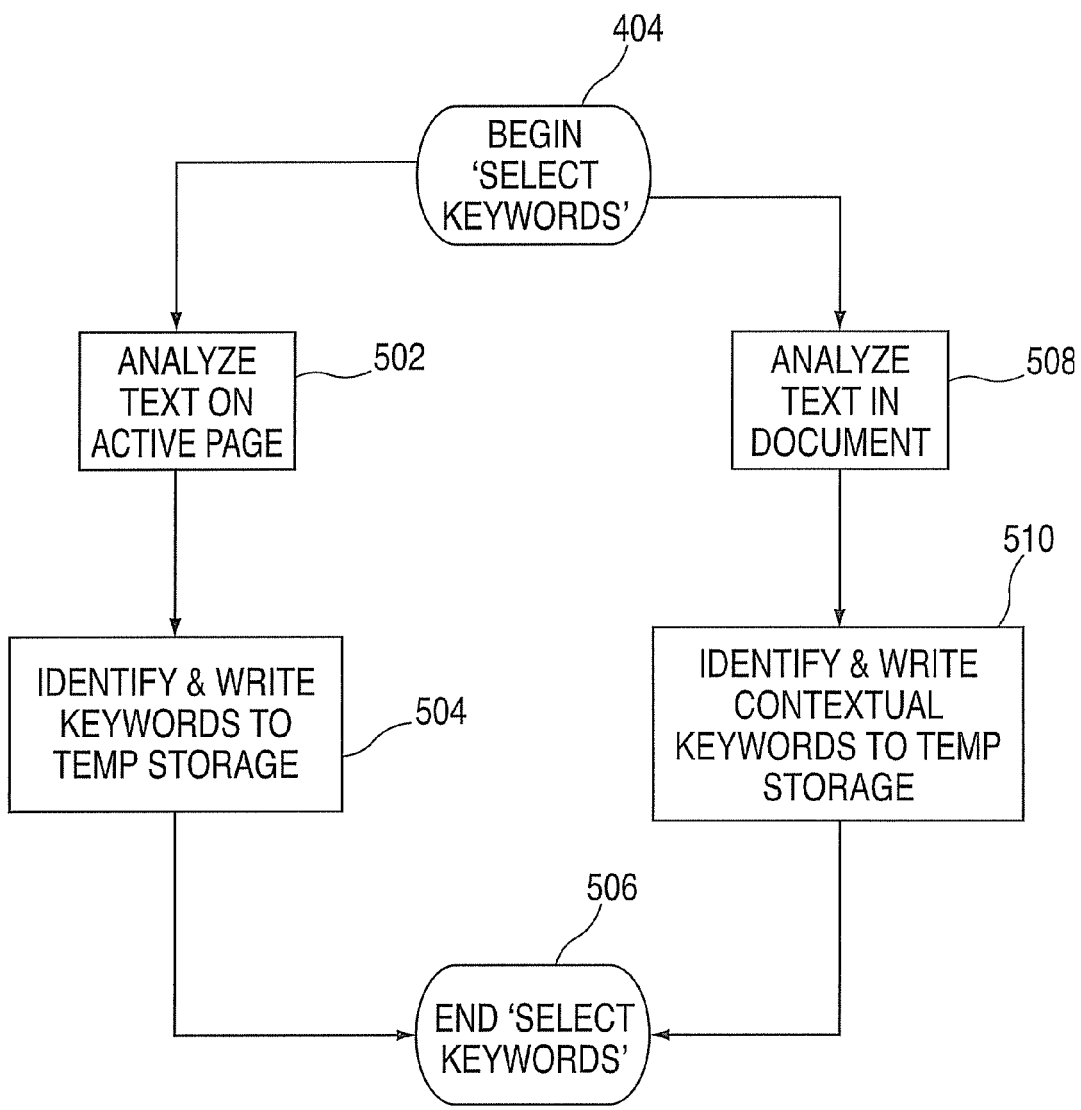
FIG. 5 is a flowchart describing the process of selecting keywords to be searched is performed by the content generation system in an exemplary embodiment.

Turning to FIG. 5, the process of determining keywords for searching (step 404) is described. At step 502, the intelligent agent 118 analyzes the text on the active page of the active document 124. The active page refers to the current page that is being created and/or edited by the content creator. The analysis includes scanning the text for frequently appearing words or phrases and may also include searching for specific terms if requested by the content creator. These terms are considered to be 'relevant' keywords for use in conducting searches as described in step 406 of FIG. 4 and, once found, these relevant keywords are saved in temporary storage at step 504 for purposes of performing the aforementioned searches. The 'select keyword process' ends at step 506. Either alternatively, or in conjunction with the processes of steps 502 and 504, the intelligent agent 118 may perform a contextual keyword search as described in steps 508 and 510. Specifically, at step 508 the intelligent agent 118 scans the entire active document 124 for keywords. The scanning takes into consideration not only the frequently appearing or specifically targeted terms and phrases, but also analyzes them in context with other text throughout the active document 124 before determining that a keyword is relevant. For example, while the terms "instruction" and "program" may appear frequently in the active document 124, the context of the document reveals that the subject matter relates to "software development" rather than "classroom training or academics." Based upon these findings, a scan for context may then determine other keywords in the document are relevant, even if not appearing frequently, as they can be closely associated with the relevant keywords. At step 510, these contextually relevant keywords are saved in temporary storage for later searching as described in step 406 of FIG. 4 and the 'select keyword process' 404 ends at step 506.

Figure 6:
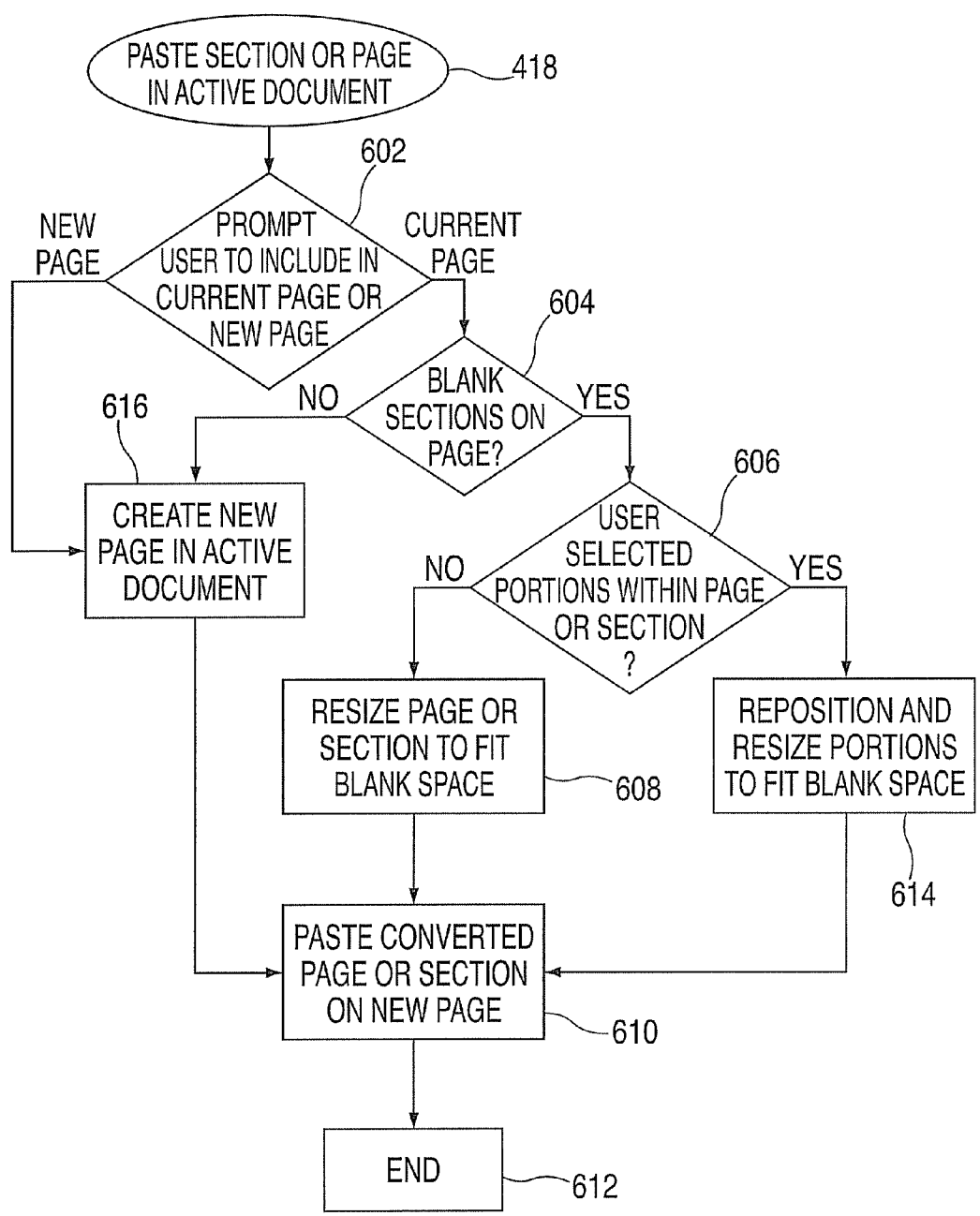
FIG. 6 is a flowchart describing the process of entering a selected search result into an active document by the content generation system in an exemplary embodiment.

Turning now to FIG. 6, the 'paste selected search result' process (step 418) is described. The content creator is prompted to either paste the selected text in the active page or a new page at step 602. If the content creator selects 'current page', the content generation system 114 looks for a blank space in the active document at the current page to enter the selected text at step 604. At step 606, it is determined whether the content creator has selected a portion of the search results for pasting into the active document or whether the entire search results are to be pasted into the active document. If the user did not select a specific portion (e.g., desires to use the entire search results), the content generation system 114 formats the search results (also referred to as page) to fit the blank space selected by the content creator at step 608, followed by pasting the formatted page into the active document at step 610.

Alternatively, if the content creator has selected specific portions of the search results at step 606, the content generation system 114 formats the selected portion to fit the blank space on the active document at step 614, followed by pasting the converted text into the active document at step 610.

Turning back to steps 602 and 604, if the content creator has selected a new page to paste the search results at step 602, or alternatively, if the content creator wishes to paste the results in the current page but the content generation system could not find a blank section at steps 602 and 604, the content generation system 114 creates a new page on the active document for placing the text, followed by pasting the text into the active document at step 610. The 'paste selected search result' process (step 406) ends at step 612.

The content generation system of the present invention may, as previously described reside on a stand-alone computer system which may have access to the Internet, or may reside on a computer system which is part of the network through which there is Internet access. With a connection to a network and/or the Internet, there are several different ways in which the process software used to implement the systems and methods of the present invention may be integrated with the network, and deployed using a local network, a remote network, an e-mail system, and/or a virtual private network. The following descriptions review the various ways of accomplishing these activities.

Integration of content generation system software. To implement the content generation systems and methods of the present invention, process software, which is composed of the software as described above and related components including any needed data structures, is written and then if desired, integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of same with reference to the flowcharts of FIGS. 7A and 7B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely, parameters passed by the software applications to the process software will be checked to ensure the parameters match the parameters required by the process software. The client and server operating systems including the network operating systems are identified and compared to the list of operating systems, version numbers and network software that have been tested to work with the process software. Those operating systems, version numbers and network software that do not match the list of tested operating systems and version numbers are then upgraded on the clients and servers to the required level.

After ensuring that the software resident on the computer systems where the process software is to be deployed is at the correct version level(s); that is, has been tested to work with the process software, the integration is completed. This is done by installing the process software on the clients and servers. Armed with the foregoing overview of the integration activity, the following detailed description of same should be readily understood.

Figure 7A:
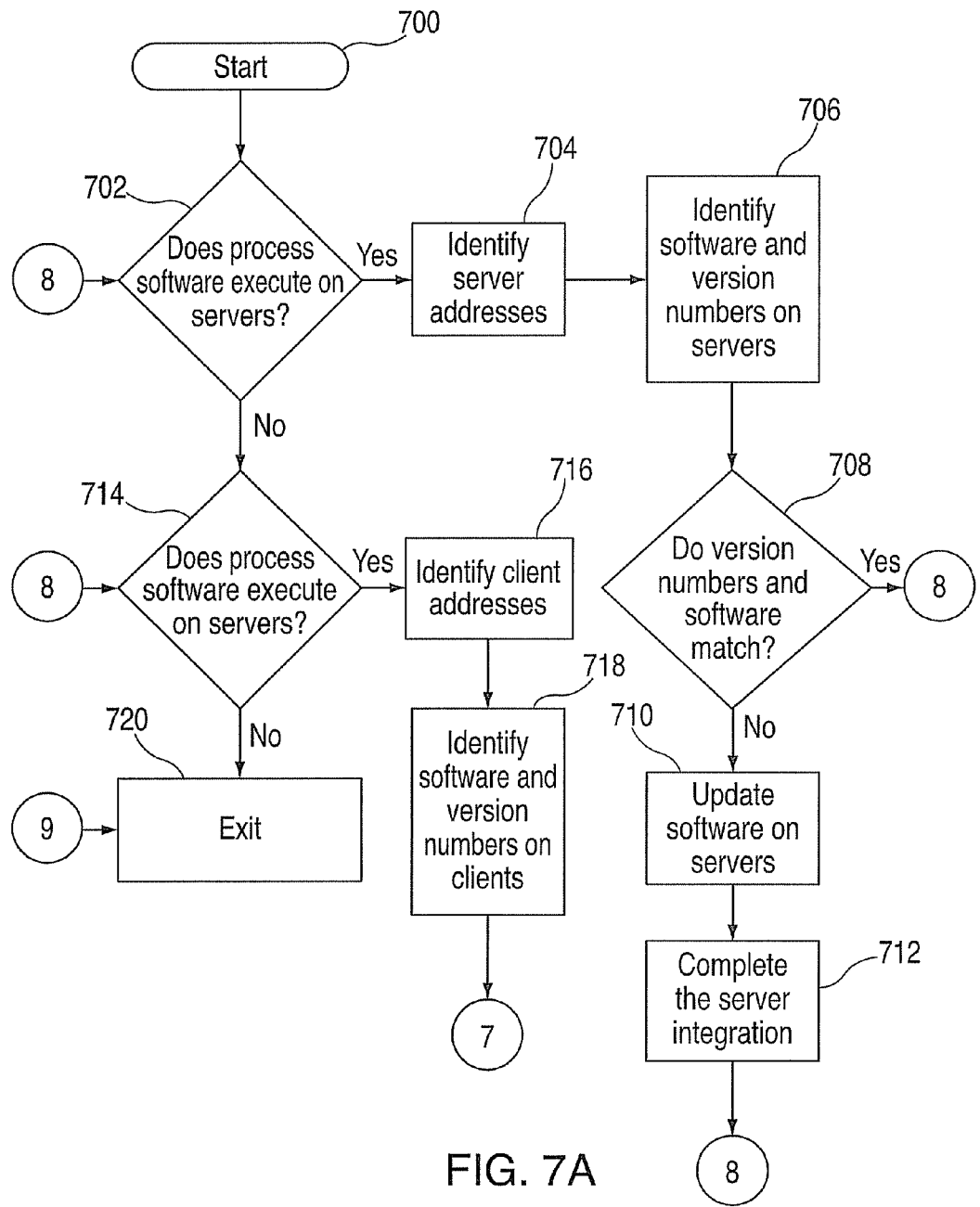
FIGS. 7A and 7B are flowcharts illustrating how the process software implementing the systems and methods of the invention may be integrated into client, server, and network environments.
Figure 7B:
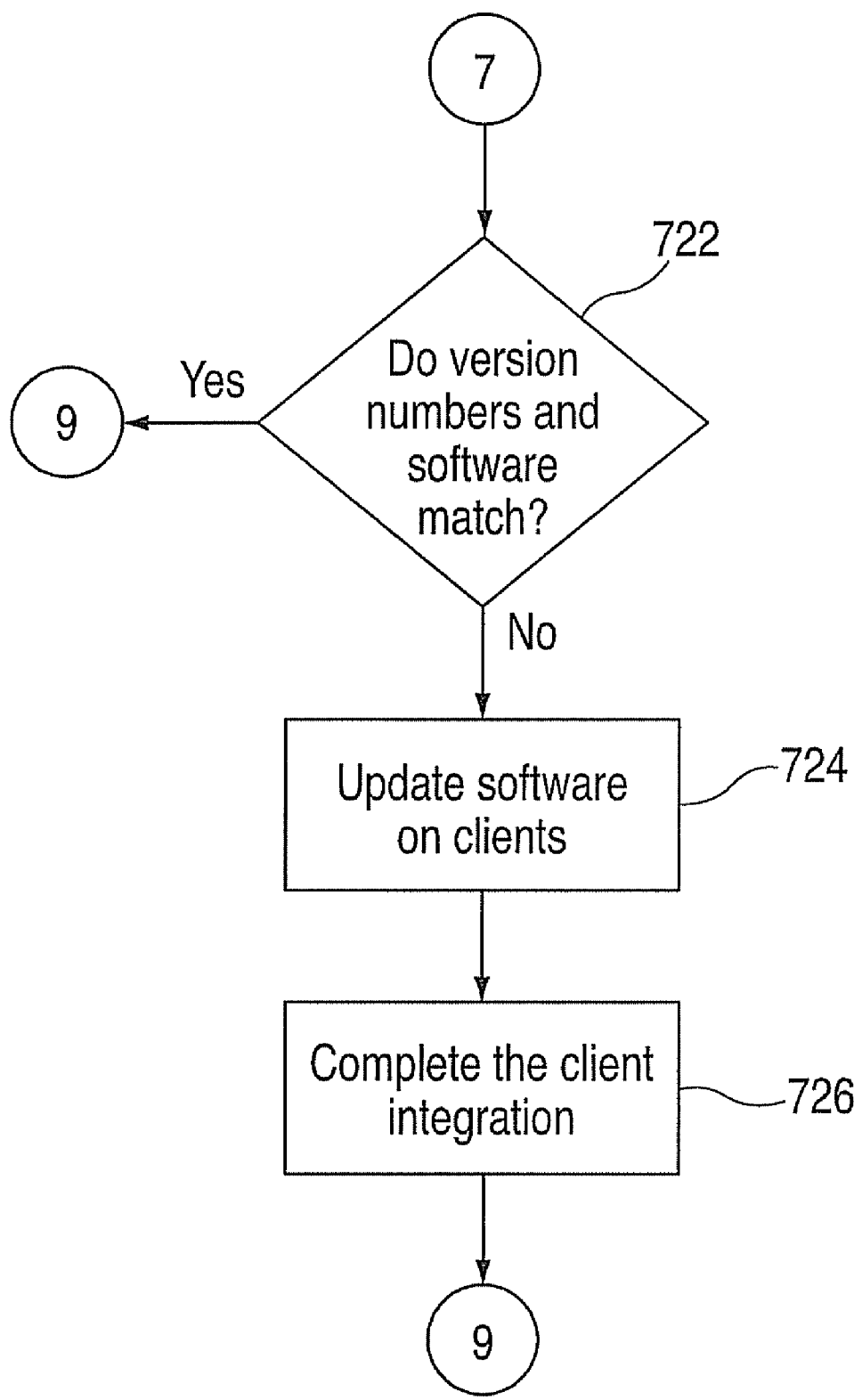

Referring to FIGS. 7A and 7B, step 700 begins the integration of the process software for implementing the content generation systems and methods of the present invention. It is determined whether there are any process software programs that will execute on a server or servers at step 702. If this is not the case, then integration proceeds to determine if the process software will execute on clients at step 714. If this is the case, then the server addresses are identified at step 704. The servers are checked to see if they contain software that includes the operating system (OS), applications, and network operating systems (NOS), together with their version numbers, that have been tested with the process software at step 706. The servers are also checked to determine if there is any missing software that is required by the process software as part of the activity at step 706. A determination is made if the version numbers match the version numbers of OS, applications and NOS that have been tested with the process software at step 708. If all of the versions match, and there is no missing required software, the integration continues at step 714. If one or more of the version numbers do not match, then the unmatched versions are updated on the server or servers with the correct versions at step 710. Additionally, if there is missing required software, then it is updated on the server or servers at step 710. The server integration is completed by installing the process software at step 712.

Step 714, which follows either of steps 702, 708 or 712, determines if there are any programs of the process software that will execute on the clients. If no process software programs execute on the clients, the integration proceeds to step 720 and exits. If this not the case, then the client addresses are identified at step 716.

At step 718, the clients are checked to see if they contain software that includes the operating system (OS), applications, and network operating systems (NOS) software, together with their version numbers, that have been tested with the process software. The clients are also checked at step 718 to determine if there is any missing software that is required by the process software.

At step 722, a determination is made if the version numbers match the version numbers of OS, applications and NOS that have been tested with the process software. If all of the versions match and there is no missing required software, then the integration proceeds to step 720 and exits.

If one or more of the version numbers do not match, then the unmatched versions are updated on the clients with the correct versions at step 724. In addition, if there is missing required software, then the required software is updated on the clients as part of step 724. The client integration is completed by installing the process software on the clients at step 726. The integration proceeds to step 720 and exits.

Deployment of content generation system software. It should be well understood that the process software for implementing the content generation system of the present invention may be deployed by manually loading the process software directly into the client, server and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and stored on the proxy server. Armed with this overview of the possible deployment processes, the following detailed description of same with reference to FIGS. 8A and 8B, where the deployment processes are illustrated, will be more easily understood.

Step 800 begins the deployment of the process software. It is determined whether there are any programs that will reside on a server or servers when the process software is executed at step 802. If the answer is "yes", then the servers that will contain the executables are identified, as indicated in step 836 in FIG. 8B. The process software for the server or servers is transferred directly to the servers' storage via FTP or some other protocol or by copying though the use of a shared file system at step 838. The process software is then installed on the servers as indicated at step 840.

Figure 8A:
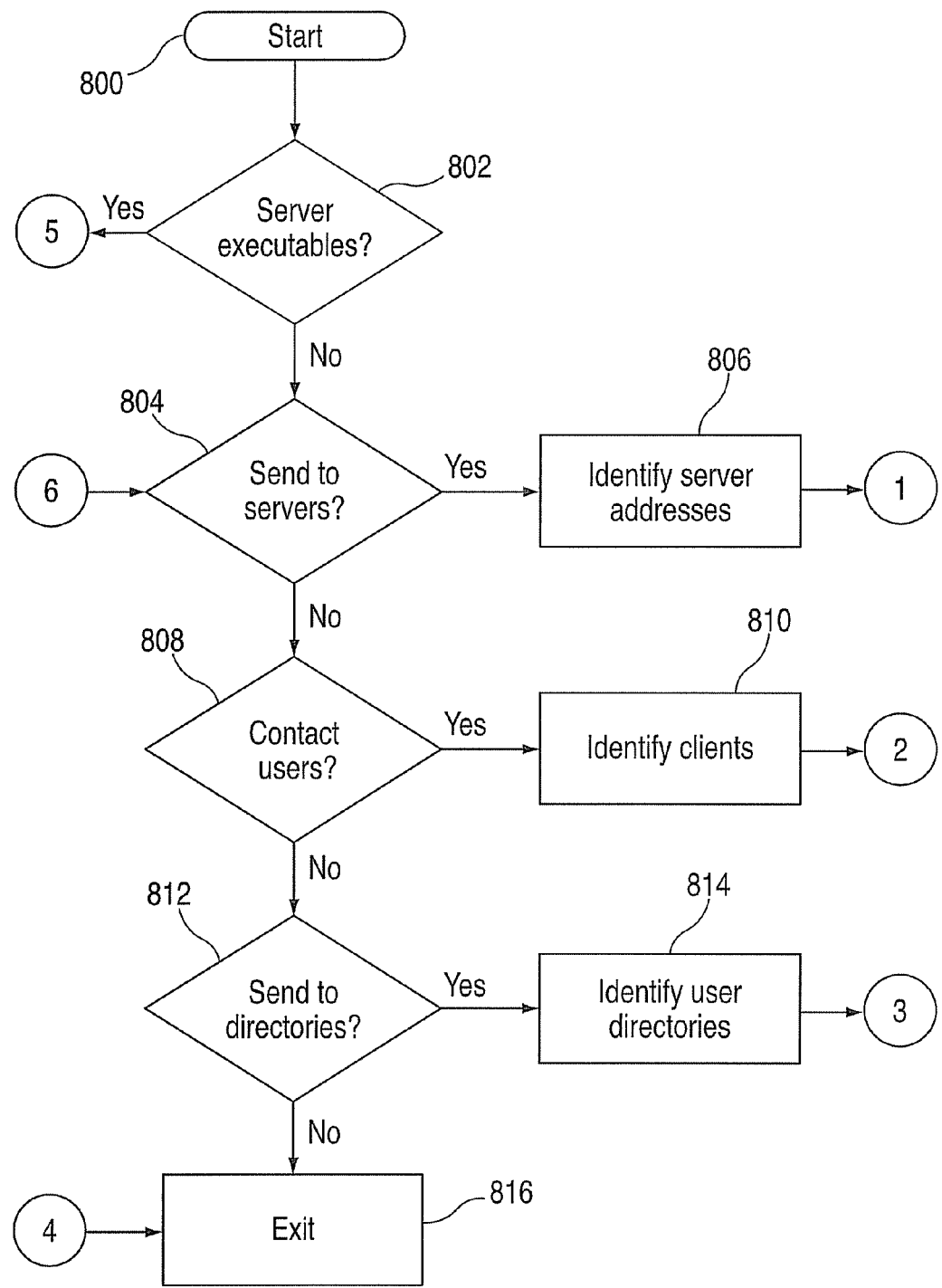
FIGS. 8A and 8B are flowcharts illustrating various ways in which the process software of the invention may be semi-automatically or automatically deployed across various networks and onto server, client (user), and proxy computers.
Figure 8B:
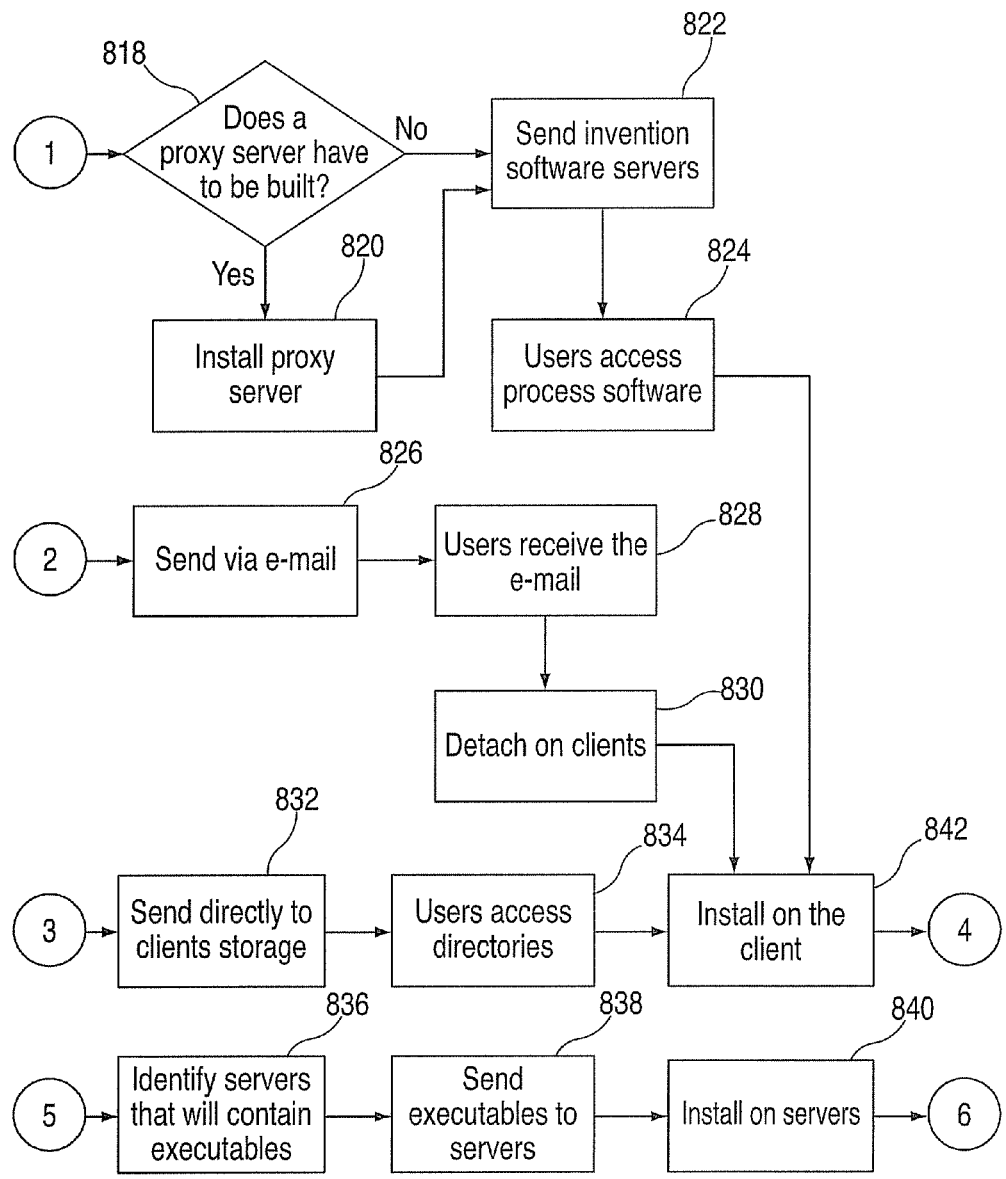

Next, as shown in step 804 of FIG. 8A, a determination is made of whether the process software is to be deployed by having users access the process software on a server or servers. If the users are to access the process software on servers, then the server addresses that will store the process software are identified at step 806.

Next, as shown at step 818, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed as indicated at step 820. Next, the process software for implementing the present invention is sent to the servers, as indicated in step 822 either via a protocol such as FTP or it is copied directly from the source files to the server files via file sharing. Another way of sending the process software to the servers is to send a transaction to the servers that contain the process software and have the server process the transaction. In this manner, the process software may be received by and copied into the server's file system. Once the process software is stored at the servers, the users via their client computers then access the process software on the servers and copy it into to the file systems of their client computers at step 824. Another alternative is to have the servers automatically copy the process software to each client and then run the installation program for the process software at each client computer. Either way, the user computer executes or causes to be executed the program that installs the process software on the client computer at step 842 and the process exits at step 816.

Continuing now at step 808 in FIG. 8A, a determination is made as to whether the process software is to be deployed by sending the process software to users via e-mail. If the answer is yes, then, as indicated at step 810, the set of users where the process software will be deployed are identified together with the addresses of the user client computers. The process software is sent via e-mail in step 826 (shown in FIG. 8B) to each of the users' client computers. Then, as indicated in step 828, the users receive the e-mail and detach the process software from the e-mail to a directory on their client computers at step 830. The user then executes the program that installs the process software on his client computer at step 842 and exits the process at step 816.

Continuing at step 812 (see bottom of FIG. 8A), a determination is made of whether the process software will be sent directly to user directories on their client computers. If so, the user directories are identified at step 814. Then, the process software is transferred directly to the identified directory on the user's client computer, as indicated in step 832. This can be done in several ways such as, but not limited to, sharing the file system directories and copying from the sender's file system to the recipient user's file system or, alternatively, using a transfer protocol such as File Transfer Protocol (FTP). Next, the users access the directories on their client file systems, as indicated in step 834, in preparation for installing the process software. Finally, the user executes the program that installs the process software on his client computer at step 842 and then exits the process at step 816.

Use of Virtual Private Networks for content generation system software. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee (s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters may then dial a phone number (e.g., a toll-free number) or attach directly via a cable, DSL, or wireless modem to reach the NAS and use their VPN client software to access the corporate network and to access, download, and execute the process software.

When using a site-to-site VPN, the process software is typically deployed, accessed, and executed through the use of dedicated equipment and large-scale encryption. These tools are often used to connect multiple fixed sites of a larger company over a public network such as the Internet.

The process software is transported over the VPN via a process called tunneling. Tunneling is a process involving the placement of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 9A-9C should be more readily understood.

Figure 9A:
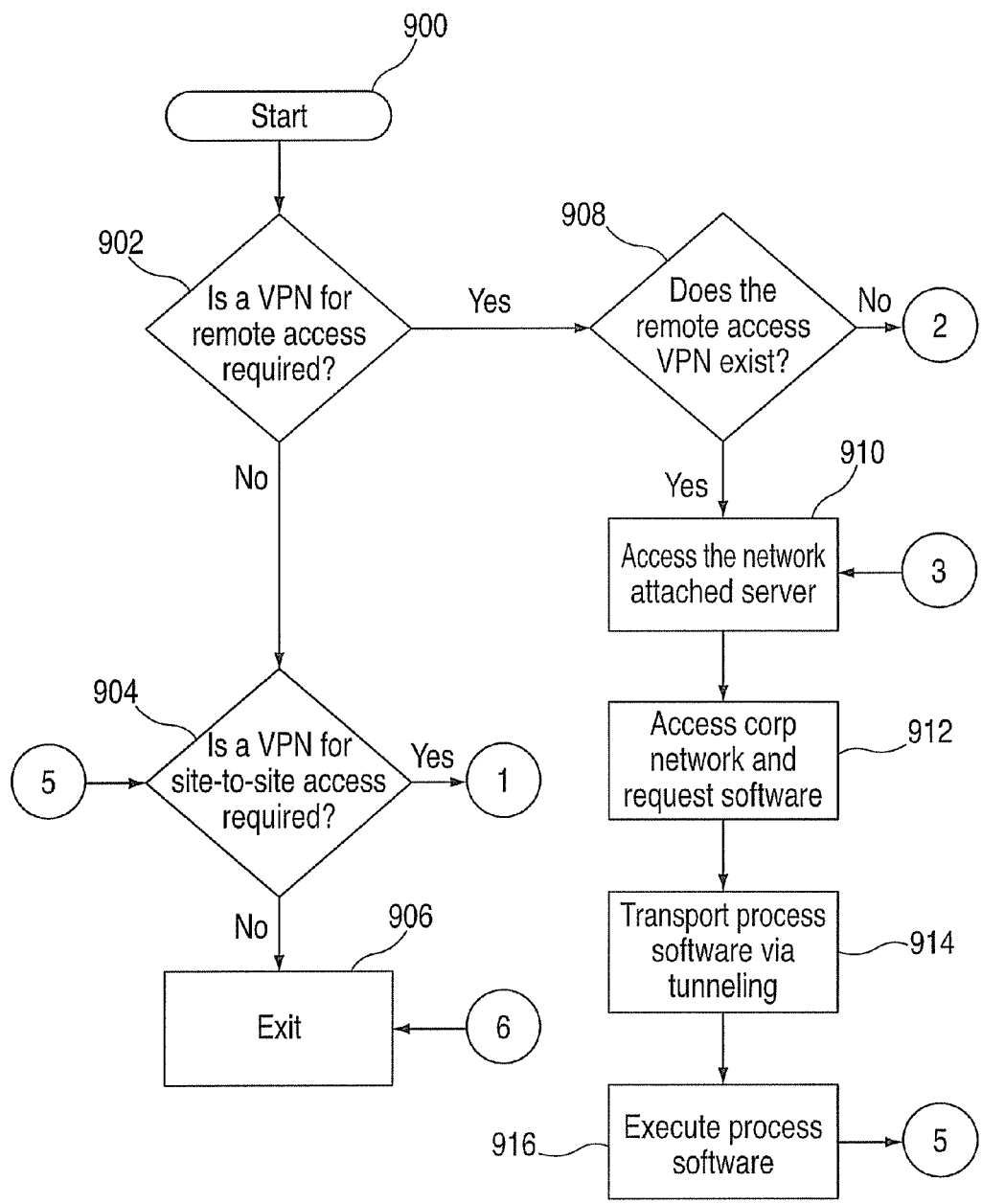
FIGS. 9A through 9C are flowcharts illustrating how process software for implementing the systems and methods of the invention are deployed through the installation and use of two different forms of a virtual private network (VPN)
Figure 9B:
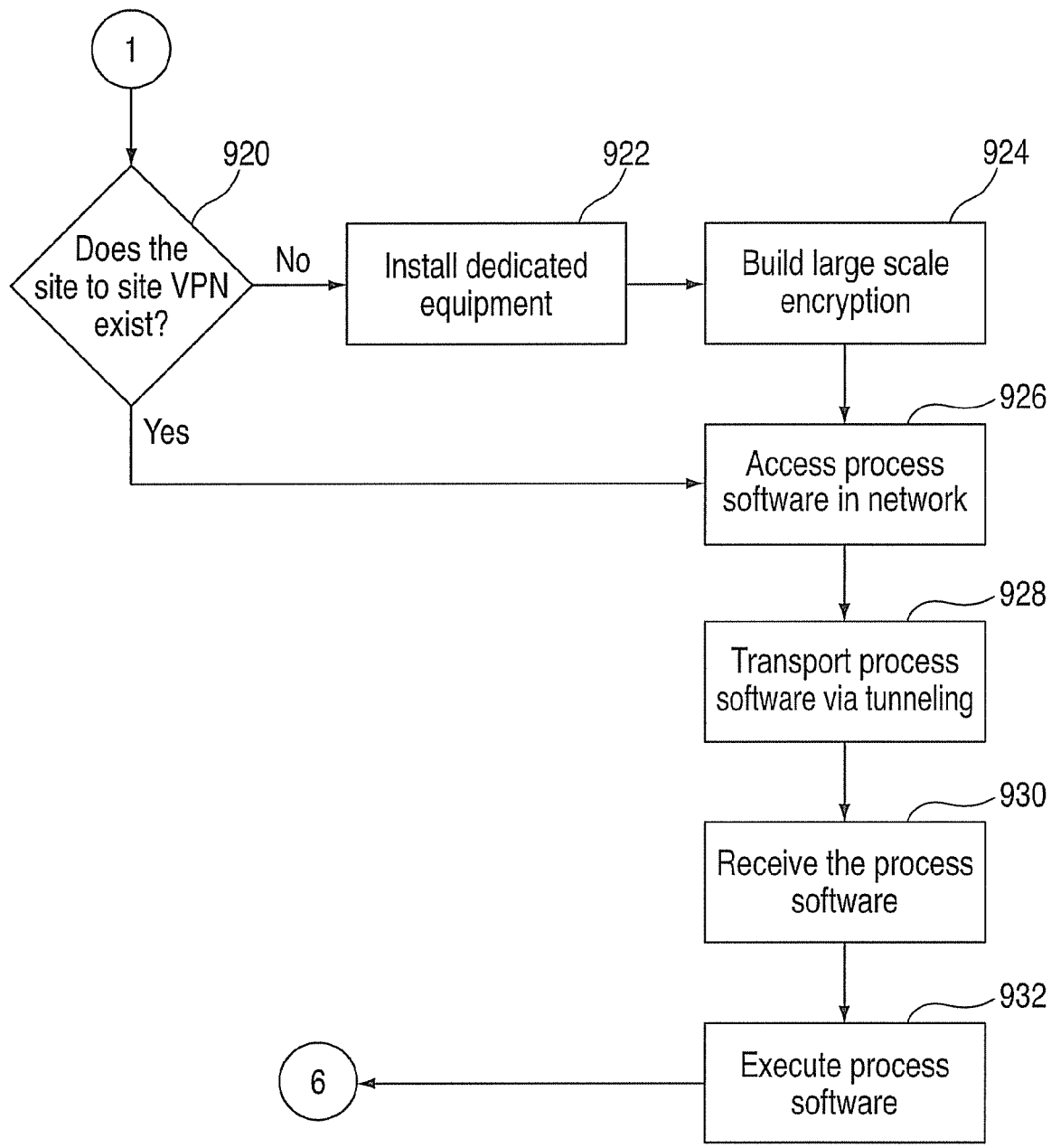
Figure 9C:
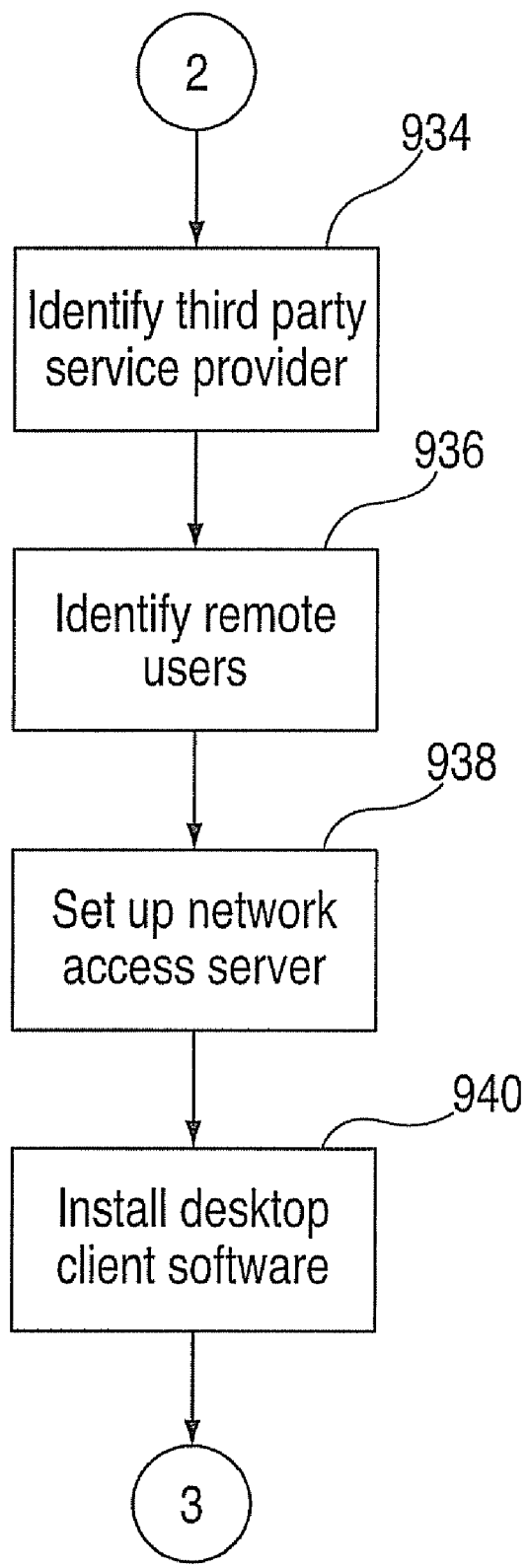

Step 900 in FIG. 9A begins the virtual private network (VPN) process. A determination is made at step 902 to see if a VPN for remote access is required. If it is not required, then flow proceeds to step 904. If it is required, then flow proceeds to step 908 where a determination is made if as to whether a remote access VPN exists that is available for use.

If a remote access VPN does exist, then flow proceeds to step 910 in FIG. 9A. Otherwise flow proceeds to step 934 (see top of FIG. 9C), where a third party provider that will provide the secure, encrypted connections between the company's private network and the company's remote users is identified. Next, as indicated in step 936, the company's remote users are identified. Then, at step 938, the identified third party provider sets up a network access server (NAS). The NAS allows the remote users to dial a phone number (e.g., a toll free number) or attach directly via a cable, DSL, wireless, or other modem to access, download, and install the desktop client software for the remote-access VPN as indicated at step 940.

Returning to step 910 in FIG. 9A, after the remote access VPN has been built or if it been previously installed, the remote users can then access the process software by dialing into the NAS or attaching directly via a cable, DSL, or other modem into the NAS. This step 910 allows entry into the corporate network, as indicated at step 912, where the process software may be accessed. The process software is transported to the remote user's desktop computer over the network via tunneling. During tunneling, see step 914, the process software is divided into packets and each packet including the data and protocol for that packet, is placed within another packet. When the process software arrives at the remote user's desktop computer, it is removed from the packets, reconstituted, and then may be executed on the remote users desktop, as indicated at step 916.

Returning now to step 904 in FIG. 9A, a determination is made to see if a VPN for site-to-site access is required. If it is not required, then flow proceeds to the exit at step 906. If it is required, flow proceeds to step 920 (see top of FIG. 9B) to determine if the site-to-site VPN exists. If it does exist, then flow proceeds to step 926. If it does not exist, then as indicated at step 922, dedicated equipment required to establish a site-to-site VPN is installed. Then a large-scale encryption is built into the VPN at step 924.

After the site-to-site VPN has been built, or if it had been previously established, the users access the process software via the VPN as indicated in step 926. Next, the process software is transported to the site users over the network via tunneling as indicated in step 928. As previously explained, the process software is divided into packets and each packet including the data and protocol is placed within another packet, as indicated in step 930. When the process software arrives at the remote user's desktop, it is removed from the packets, reconstituted, and executed on the site user's desktop at step 932 and the process proceeds to step 906 and exits.

Figure 10A:
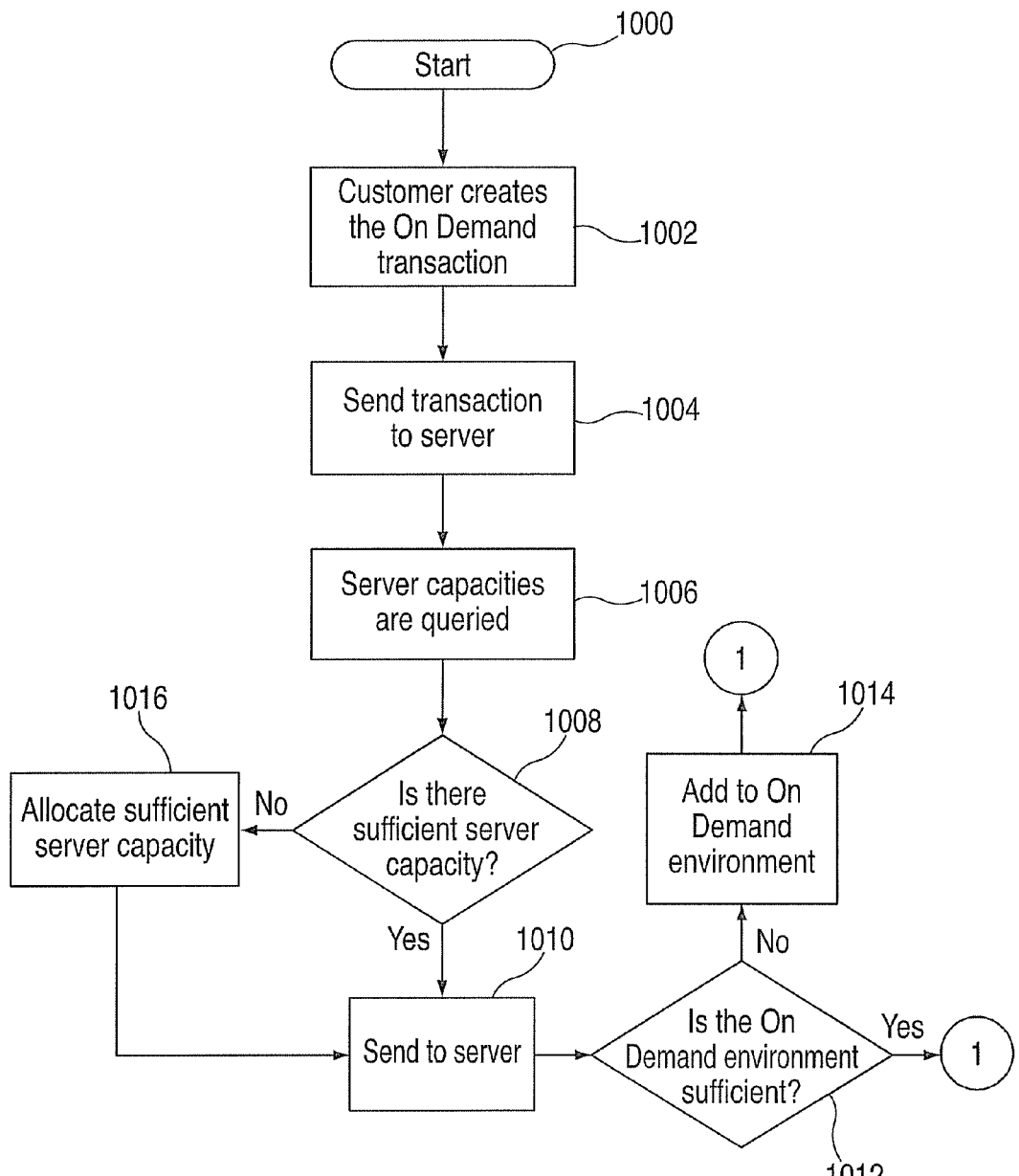
FIGS. 10A and 10B are flowcharts illustrating how the process software for implementing the systems and methods of the invention can be deployed through an On Demand business model, which allows the process software to be shared and simultaneously service multiple customers in a flexible, automated fashion under a pay-for-what-you-use plan.
Figure 10B:
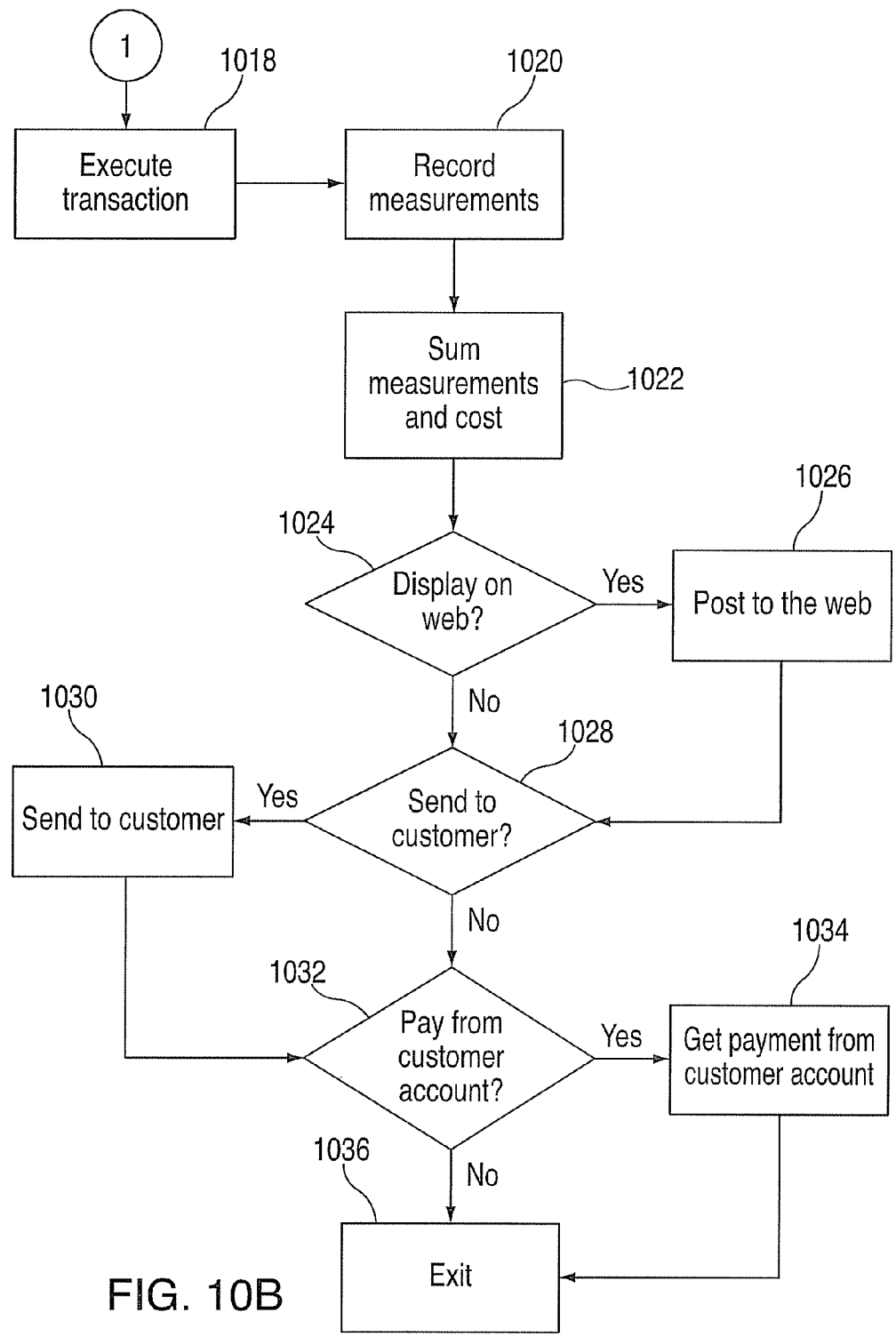

On Demand Computing for content generation system software. The process software for implementing the content generation system of the present invention may be shared; that is, it may be used to simultaneously serve multiple customers in a flexible, automated fashion. It is process software that is easily standardized, requiring little customization, and is scalable, thus providing capacity on demand in a pay-as-you-go model known as "on demand" computing. An overview of on demand computing as applied to the content generation system software will now be provided, followed by a more detailed description of same made with reference to the flowcharts of FIGS. 10A and 10B.

The process software for implementing the present invention can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, the following detailed description of same with reference to FIGS. 10A and 10B where the on demand processes are illustrated, will be more easily understood.

Step 1000 begins the On Demand process. A transaction is created that contains the unique customer identification, the requested service type and any service parameters that further specify the type of service as indicated in step 1002. The transaction is then sent to the main server as shown in step 1004. In an On Demand environment, the main server may initially be the only server. As capacity is consumed, other servers are added to the On Demand environment.

The server central processing unit (CPU) capacities in the On Demand environment are queried at step 1006. The CPU requirement of the transaction is estimated, then the servers available CPU capacity in the On Demand environment are compared to the transaction CPU requirement to see if there is sufficient CPU available capacity in any server to process the transaction as indicated in step 1008. If there is not sufficient server CPU available capacity, then additional server CPU capacity is allocated to process the transaction as indicated in step 1016. If there was already sufficient available CPU capacity, the transaction is sent to a selected server at step 1010.

Before executing the transaction, a check is made of the remaining On Demand environment to determine if the environment has sufficient available capacity for processing the transaction as indicated at step 1012. This environment capacity consists of elements such as, but not limited to, network bandwidth, processor memory, storage, etc. If there is insufficient available capacity, then capacity will be added to the On Demand environment as indicated in step 1014. The required software to process the transaction is accessed, loaded into memory, and the transaction is executed as indicated in step 1018.

The usage measurements are recorded as indicated in step 1020. The usage measurements consist of the portions of those functions in the On Demand environment that are used to process the transaction. The usage of functions such as, but not limited to, network bandwidth, processor memory, storage and CPU cycles are recorded. The usage measurements are summed, multiplied by unit costs, and recorded as a charge to the requesting customer as indicated in step 1022.

If the customer has requested that the On Demand costs be posted to a web site as indicated in step 1024, then they are posted to a web site at step 1026. If the customer has requested that the On Demand costs be sent via e-mail to a customer address as indicated in step 1028, then they are sent to the customer via e-mail as indicated in step 1030. If the customer has requested that the On Demand costs be paid directly from a customer account at step 1032, then payment is received directly from the customer account at step 1034. The On Demand process proceeds to step 1036 and then exits.

As will be appreciated from the above description, the restrictions and limitations that exist with current document creation applications are efficiently overcome. The content generation system of the invention enables a background search to be performed for relevant information during the creation of a presentation or document. The available material in the presentation provides the context for searching and scoring the 'found' references. Relevant search results are provided to the document creator, on or near the page that is most relevant to the page that is active in the user's presentation. The user may then select from the relevant search results and enter it into the current presentation or document.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for providing web-based electronic research and presentation functions via a document creation application, comprising:

scanning an active document on a computer device operable for identifying relevant keywords;

searching at least one database for reference materials relating to the relevant keywords, the at least one database including an internal database and an external database;

automatically displaying relevant reference materials on the computer device;

converting the reference materials if the reference materials are in a format different from a format used in creating the active document; and displaying the reference materials on the computer device;

wherein the active document includes data currently being entered or edited by a user on the computer device; and wherein the scanning an active document on a computer device operable for identifying relevant keywords is performed by an intelligent search agent, the method further including:

scanning text of the active page for the active document for at least one of:
frequently appearing terms;
frequently appearing phrases;
specific terms requested by the user; and
context to determine relationships among terms within the active document;

determining relevance of found terms or phrases resulting from the scanning, the determining relevance of found terms or phrases based upon rules prescribed by the intelligent agent, the relevance of the found terms is determined by comparing the found terms to a list of terms stored in a temporary storage, the list of terms comprising frequently occurring words and terms specified by the user; and storing relevant results in a temporary storage location operable for performing the searching, the method further comprising on demand sharing of process software for providing the web-based electronic research and presentation functions via a document creation application, the on demand sharing comprising:

creating a transaction containing unique customer identification, requested service type, and service parameters;

sending the transaction to at least one main server;

querying the at least one main server about processing capacity associated with the at least one main server to help ensure availability of adequate resources for processing of the transaction; and allocating additional processing capacity in response to determining that the main server does not have the adequate resources to process the transaction, the additional processing capacity being selected from the group of additional capacities consisting of central processing unit capacity, processor memory capacity, network bandwidth capacity, and storage capacity.

2. The method of claim 1, further comprising recording a plurality of usage measurements selected from the group of usage measurements consisting of network bandwidth, processor memory, storage, and central processing unit cycles.

3. The method of claim 1, further comprising:
summing the usage measurements;
acquiring at least one multiplicative value associated with the usage measurements and with unit costs; and
recording any such acquired multiplicative value as an on demand charge to a requesting customer.

4. The method of claim 3, further comprising at least one of:
posting the on demand charge on a web site if requested by the requesting customer; and
sending the on demand charge via e-mail to the requesting customer's e-mail address.

5. The method of claim 3, further comprising charging the on demand charge to the requesting customer's account if an account exists and if the requesting customer has selected a charge account payment method.

6. The method of claim 1, wherein displaying the reference materials on the computer device includes at least one of:
intermittently flashing text of the reference materials on a computer screen of the computer device;
displaying a Uniform Resource Locator associated with the reference materials on a computer screen of the computer device;
displaying a Uniform Resource Locator with a preview pane associated with the reference materials on a computer screen of the computer device;
displaying text of the reference materials on a computer screen of the computer device in response to a user highlighting a term or section of text within the active document;
displaying images of the reference materials on a computer screen of the computer device in response to a user highlighting a term or section of text within the active document; and
displaying images in a preview pane of the reference materials on a computer screen of the computer device in response to a user highlighting a term or section of text within the active document.

7. The method of claim 1, further comprising:
displaying text of the reference materials on a projector screen via a presentation application executing on the computer device, the displaying text of the reference materials on a project screen performed in response to a user selecting the reference materials for display;
wherein the projector screen is in communication with the computer device.

8. The method of claim 1, wherein displaying the reference materials includes enabling a toggle switch of a content generation application to activate the display, the content generation application in communication with the document creation application through which the active document is created.

9. The method of claim 1, wherein displaying the reference materials includes prompting the user to select an option from options including cutting and pasting the reference materials into the active document, cutting and pasting the reference materials into a new page; and cutting and pasting a user-selected portion of the reference materials into one of the active document and the new page.

10. A storage medium encoded with machine-readable computer program code for providing web-based electronic research and presentation functions via a document creation application, the storage medium including instructions for causing a computer to implement a method, comprising:
scanning an active document on a computer device operable for identifying relevant keywords;
searching at least one database for reference materials relating to the relevant keywords, the at least one database including an internal database and an external database;
automatically displaying relevant reference materials on the computer device;
converting the reference materials if the reference materials are in a format different from a format used in creating the active document; and
displaying the reference materials on the computer device;
wherein the active document includes data currently being entered or edited by a user on the computer device; and
wherein the scanning an active document on a computer device operable for identifying relevant keywords is performed by an intelligent search agent, the method further including:
scanning text of the active page for the active document for at least one of:
frequently appearing terms;
frequently appearing phrases;
specific terms requested by the user; and
context to determine relationships among terms within the active document;
determining relevance of found terms or phrases resulting from the scanning, the determining relevance of found terms or phrases based upon rules prescribed by the intelligent agent, the relevance of the found terms is determined by comparing the found terms to a list of terms stored in a temporary storage, the list of terms comprising frequently occurring words and terms specified by the user; and
storing relevant results in a temporary storage location operable for performing the searching, the method further comprising on demand sharing of process software for providing the web-based electronic research and presentation functions via a document creation application, the on demand sharing comprising:
creating a transaction containing unique customer identification, requested service type, and service parameters;
sending the transaction to at least one main server;
querying the at least one main server about processing capacity associated with the at least one main server to help ensure availability of adequate resources for processing of the transaction; and
allocating additional processing capacity in response to determining that the main server does not have the adequate resources to process the transaction, the additional processing capacity being selected from the group of additional capacities consisting of central processing unit capacity, processor memory capacity, network bandwidth capacity, and storage capacity.

11. The storage medium of claim 10, further comprising instructions for recording a plurality of usage measurements selected from the group of usage measurements consisting of network bandwidth, processor memory, storage, and central processing unit cycles.

12. The storage medium of claim 10, further comprising instructions for implementing:
summing the usage measurements;

acquiring at least one multiplicative value associated with the usage measurements and with unit costs; and recording any such acquired multiplicative value as an on demand charge to a requesting customer.

13. The storage medium of claim 12, further comprising instructions for implementing at least one of:

posting the on demand charge on a web site if requested by the requesting customer; and sending the on demand charge via e-mail to the requesting customer's e-mail address.

14. The method of claim 12, further comprising instructions for charging the on demand charge to the requesting customer's account if an account exists and if the requesting customer has selected a charge account payment method.

15. The storage medium of claim 10, wherein displaying the reference materials on the computer device includes at least one of:

intermittently flashing text of the reference materials on a computer screen of the computer device;

displaying a Uniform Resource Locator associated with the reference materials on a computer screen of the computer device;

displaying a Uniform Resource Locator with a preview pane associated with the reference materials on a computer screen of the computer device;

displaying text of the reference materials on a computer screen of the computer device in response to a user highlighting a term or section of text within the active document;

displaying images of the reference materials on a computer screen of the computer device in response to a user highlighting a term or section of text within the active document; and displaying images in a preview pane of the reference materials on a computer screen of the computer device in response to a user highlighting a term or section of text within the active document.

16. The storage medium of claim 10, further comprising instructions for implementing:

displaying text of the reference materials on a projector screen via a presentation application executing on the computer device, the displaying text of the reference materials on a project screen performed in response to a user selecting the reference materials for display;

wherein the projector screen is in communication with the computer device.

17. The storage medium of claim 10, wherein displaying the reference materials includes enabling a toggle switch of a content generation application to activate the display, the content generation application in communication with the document creation application through which the active document is created.

18. The storage medium of claim 10, wherein displaying the reference materials includes prompting the user to select an option from options including cutting and pasting the reference materials into the active document, cutting and pasting the reference materials into a new page; and cutting and pasting a user-selected portion of the reference materials into one of the active document and the new page.

* * * * *